(12) United States Patent
Zywicki et al.

(10) Patent No.: US 11,206,171 B2
(45) Date of Patent: Dec. 21, 2021

(54) SYSTEMS AND METHODS FOR DYNAMIC DEVICE PROGRAMMING

(71) Applicant: CalAmp Corp., Irvine, CA (US)

(72) Inventors: Dean Zywicki, Irvine, CA (US); Robert Shields, Irvine, CA (US)

(73) Assignee: CalAmp Corp., Irvine, CA (US)

( * ) Notice: Subject to any disclaimer, the term of this patent is extended or adjusted under 35 U.S.C. 154(b) by 347 days.

(21) Appl. No.: 15/828,102

(22) Filed: Nov. 30, 2017

(65) Prior Publication Data

US 2019/0140886 A1 May 9, 2019

Related U.S. Application Data

(60) Provisional application No. 62/582,818, filed on Nov. 7, 2017.

(51) Int. Cl.
*G07C 5/00* (2006.01)
*H04L 29/08* (2006.01)
*G01S 19/39* (2010.01)
*G08C 17/02* (2006.01)

(52) U.S. Cl.
CPC ........ *H04L 29/08558* (2013.01); *G01S 19/39* (2013.01); *G07C 5/008* (2013.01); *H04L 67/12* (2013.01); *G08C 17/02* (2013.01); *G08C 2200/00* (2013.01)

(58) Field of Classification Search
CPC ........ G07C 5/008; G07C 5/0808; G07C 5/04; G07C 5/10; G07C 5/0816; H04L 67/2842; H04Q 9/00
See application file for complete search history.

(56) References Cited

U.S. PATENT DOCUMENTS

| 4,549,277 A | 10/1985 | Brunson et al. |
| 5,117,375 A | 5/1992 | Worcester et al. |
| 5,251,161 A | 10/1993 | Gioutsos et al. |

(Continued)

FOREIGN PATENT DOCUMENTS

| WO | 2000017607 | 3/2000 |
| WO | 2002018873 | 3/2002 |

(Continued)

OTHER PUBLICATIONS

Extended European Search Report for European Application No. 13875407.2, Search completed Nov. 22, 2016, dated Nov. 30, 2016, 7 Pgs.

(Continued)

*Primary Examiner* — Kenneth J Malkowski
(74) *Attorney, Agent, or Firm* — Barnes & Thornburg LLP (57) ABSTRACT

Systems and methods for dynamic device programming in accordance with embodiments of the invention are disclosed. One embodiment includes a vehicle telematics device including a processor, a memory containing a dynamic telematics messaging application, a plurality of accumulators, and a communications interface, wherein the dynamic telematics messaging application directs the processor to obtain a first message data describing a requested set of sensor data using the communications interface, dynamically reconfigure the plurality of accumulators to measure the requested set of sensor data, and transmit a second message data describing the measured set of sensor data.

20 Claims, 6 Drawing Sheets

(56) References Cited

U.S. PATENT DOCUMENTS

| | | | |
|---|---|---|---|
| 5,339,242 A | 8/1994 | Jensen et al. | |
| 5,559,699 A | 9/1996 | Gioutsos et al. | |
| 5,563,791 A | 10/1996 | Gioutsos et al. | |
| 5,587,906 A | 12/1996 | Muckley et al. | |
| 5,684,701 A | 11/1997 | Breed et al. | |
| 5,754,849 A | 5/1998 | Dyer et al. | |
| 5,758,301 A | 5/1998 | Saito et al. | |
| 5,780,782 A | 7/1998 | O'Dea et al. | |
| 5,825,283 A | 10/1998 | Camhi | |
| 5,841,201 A | 11/1998 | Ibaraki et al. | |
| 5,862,511 A | 1/1999 | Croyle et al. | |
| 6,029,111 A | 2/2000 | Croyle | |
| 6,076,028 A | 6/2000 | Donnelly et al. | |
| 6,085,151 A | 7/2000 | Farmer et al. | |
| 6,163,690 A | 12/2000 | Lilja | |
| 6,269,290 B1 | 7/2001 | Tsuji et al. | |
| 6,308,134 B1 | 10/2001 | Croyle et al. | |
| 6,346,876 B1 | 2/2002 | Flick | |
| 6,356,841 B1 | 3/2002 | Hamrick et al. | |
| 6,363,308 B1 | 3/2002 | Potti et al. | |
| 6,401,027 B1 | 6/2002 | Xu et al. | |
| 6,417,802 B1 | 7/2002 | Diesel | |
| 6,431,593 B1 | 8/2002 | Cooper et al. | |
| 6,438,475 B1 | 8/2002 | Gioutsos et al. | |
| 6,532,419 B1 | 3/2003 | Begin | |
| 6,540,255 B1 | 4/2003 | Garcia et al. | |
| 6,611,755 B1 | 8/2003 | Coffee et al. | |
| 6,737,989 B2 | 5/2004 | Flick | |
| 6,756,885 B1 | 6/2004 | Flick | |
| 6,812,888 B2 | 11/2004 | Drury et al. | |
| 6,832,140 B2 | 12/2004 | Fan et al. | |
| 6,850,839 B1 | 2/2005 | Mcgibney | |
| 7,015,830 B2 | 3/2006 | Flick | |
| 7,020,501 B1 | 3/2006 | Elliott et al. | |
| 7,085,637 B2 | 8/2006 | Breed et al. | |
| 7,110,880 B2 | 9/2006 | Breed et al. | |
| 7,250,850 B2 | 7/2007 | Mizutani | |
| 7,272,493 B1 | 9/2007 | Hamrick et al. | |
| 7,286,929 B2 | 10/2007 | Staton et al. | |
| 7,348,895 B2 | 3/2008 | Lagassey et al. | |
| 7,366,608 B2 | 4/2008 | Hamrick et al. | |
| 7,391,299 B2 * | 6/2008 | Bender | G06Q 10/06 340/292 |
| 7,460,954 B2 | 12/2008 | Hamrick et al. | |
| 7,484,756 B2 | 2/2009 | Chou et al. | |
| 7,527,288 B2 | 5/2009 | Breed et al. | |
| 7,577,525 B2 | 8/2009 | Hamrick et al. | |
| 7,643,919 B2 | 1/2010 | Nicaise | |
| 7,660,652 B2 | 2/2010 | Smith et al. | |
| 7,671,727 B2 | 3/2010 | Flick | |
| 7,725,218 B2 | 5/2010 | Hamrick et al. | |
| 7,765,039 B1 | 7/2010 | Hagenbuch | |
| 7,805,231 B2 | 9/2010 | Cluff et al. | |
| 8,004,397 B2 | 8/2011 | Forrest et al. | |
| 8,010,251 B2 | 8/2011 | Hamrick et al. | |
| 8,032,278 B2 | 10/2011 | Flick | |
| 8,065,342 B1 * | 11/2011 | Borg | G06Q 10/06 707/803 |
| 8,330,626 B1 | 12/2012 | Adelson | |
| 8,489,271 B2 | 7/2013 | Hergesheimer et al. | |
| 8,635,091 B2 | 1/2014 | Amigo et al. | |
| 8,688,380 B2 | 4/2014 | Cawse et al. | |
| 8,712,633 B2 * | 4/2014 | Sul | G06F 11/3684 701/29.1 |
| 8,762,009 B2 | 6/2014 | Ehrman et al. | |
| 8,812,173 B2 | 8/2014 | Chen et al. | |
| 8,855,143 B1 | 10/2014 | Acampora | |
| 9,002,538 B2 | 4/2015 | Hergesheimer et al. | |
| 9,171,460 B2 | 10/2015 | Chen | |
| 9,179,497 B1 | 11/2015 | Teixeira et al. | |
| 9,217,757 B2 | 12/2015 | Hergesheimer et al. | |
| 9,406,222 B2 | 8/2016 | Hergesheimer et al. | |
| 9,459,277 B2 | 10/2016 | Hergesheimer et al. | |
| 9,607,449 B1 * | 3/2017 | Chen | G07C 5/008 |
| 9,644,977 B2 | 5/2017 | Camisa | |
| 9,648,579 B2 | 5/2017 | Abhishek | |
| 2002/0065045 A1 | 5/2002 | Kim et al. | |
| 2002/0100310 A1 | 8/2002 | Begin | |
| 2003/0001368 A1 | 1/2003 | Breed et al. | |
| 2003/0005117 A1 | 1/2003 | Kang et al. | |
| 2003/0121027 A1 | 6/2003 | Hines | |
| 2003/0151507 A1 | 8/2003 | Andre et al. | |
| 2003/0176959 A1 | 9/2003 | Breed et al. | |
| 2003/0216889 A1 * | 11/2003 | Marko | G07C 5/008 702/182 |
| 2004/0036261 A1 | 2/2004 | Breed et al. | |
| 2004/0075539 A1 | 4/2004 | Savoie et al. | |
| 2004/0132500 A1 | 7/2004 | Rogalski et al. | |
| 2004/0142659 A1 | 7/2004 | Oesterling | |
| 2004/0155790 A1 | 8/2004 | Tsuji et al. | |
| 2004/0171378 A1 | 9/2004 | Rautila et al. | |
| 2004/0257208 A1 | 12/2004 | Huang et al. | |
| 2005/0065711 A1 | 3/2005 | Dahlgren et al. | |
| 2005/0071314 A1 | 3/2005 | Caron | |
| 2005/0099289 A1 | 5/2005 | Arita et al. | |
| 2005/0240343 A1 | 10/2005 | Schmidt et al. | |
| 2005/0267947 A1 | 12/2005 | Patrick et al. | |
| 2005/0273516 A1 | 12/2005 | Patrick et al. | |
| 2005/0283286 A1 | 12/2005 | Kanda et al. | |
| 2006/0022469 A1 | 2/2006 | Syed et al. | |
| 2006/0031432 A1 | 2/2006 | Patrick et al. | |
| 2006/0034237 A1 | 2/2006 | Patrick et al. | |
| 2006/0041336 A1 | 2/2006 | Schubert et al. | |
| 2006/0050953 A1 | 3/2006 | Farmer et al. | |
| 2006/0074621 A1 | 4/2006 | Rachman | |
| 2006/0199537 A1 | 9/2006 | Eisenbach et al. | |
| 2007/0027612 A1 | 2/2007 | Barfoot et al. | |
| 2007/0038653 A1 | 2/2007 | Li et al. | |
| 2007/0109117 A1 | 5/2007 | Heitzmann et al. | |
| 2007/0185646 A1 * | 8/2007 | Juergen | G08C 17/02 701/533 |
| 2007/0186546 A1 * | 8/2007 | Midgley | F01N 13/10 60/302 |
| 2007/0257791 A1 | 11/2007 | Arita et al. | |
| 2007/0266078 A1 | 11/2007 | Rittle et al. | |
| 2007/0271014 A1 | 11/2007 | Breed | |
| 2007/0299587 A1 | 12/2007 | Breed et al. | |
| 2008/0043821 A1 | 2/2008 | Brockhage et al. | |
| 2008/0111666 A1 | 5/2008 | Plante et al. | |
| 2008/0114545 A1 | 5/2008 | Takaoka et al. | |
| 2008/0150707 A1 | 6/2008 | Shamoto | |
| 2008/0195261 A1 | 8/2008 | Breed | |
| 2008/0202199 A1 | 8/2008 | Finley et al. | |
| 2008/0211666 A1 | 9/2008 | Saidi et al. | |
| 2008/0211914 A1 | 9/2008 | Herrera et al. | |
| 2008/0275601 A1 | 11/2008 | Saito et al. | |
| 2009/0077229 A1 | 3/2009 | Ebbs | |
| 2009/0177350 A1 | 7/2009 | Williams et al. | |
| 2009/0217163 A1 | 8/2009 | Jaroker | |
| 2009/0217733 A1 | 9/2009 | Stachow | |
| 2009/0221320 A1 | 9/2009 | Walley et al. | |
| 2010/0039216 A1 | 2/2010 | Knight et al. | |
| 2010/0039247 A1 | 2/2010 | Ziegler et al. | |
| 2010/0039318 A1 | 2/2010 | Kmiecik et al. | |
| 2010/0097316 A1 | 4/2010 | Shaw et al. | |
| 2010/0185524 A1 | 7/2010 | Watkins | |
| 2010/0205427 A1 | 8/2010 | Bauer et al. | |
| 2010/0235433 A1 | 9/2010 | Ansari et al. | |
| 2010/0273422 A1 | 10/2010 | Garrett et al. | |
| 2010/0279647 A1 | 11/2010 | Jacobs et al. | |
| 2010/0312473 A1 | 12/2010 | Hoshizaki | |
| 2010/0318257 A1 | 12/2010 | Kalinadhabhotla | |
| 2011/0053575 A1 | 3/2011 | Veliu et al. | |
| 2011/0060496 A1 | 3/2011 | Nielsen et al. | |
| 2011/0071971 A1 | 3/2011 | Parks et al. | |
| 2011/0106373 A1 | 5/2011 | Hergesheimer et al. | |
| 2011/0109438 A1 | 5/2011 | Dijkstra et al. | |
| 2011/0130906 A1 | 6/2011 | Mayer | |
| 2011/0153367 A1 | 6/2011 | Amigo | |
| 2011/0202225 A1 | 8/2011 | Willis et al. | |
| 2011/0238289 A1 | 9/2011 | Lehmann et al. | |
| 2011/0264393 A1 | 10/2011 | An | |
| 2011/0320088 A1 | 12/2011 | Eom et al. | |
| 2012/0022780 A1 | 1/2012 | Kulik et al. | |

(56) References Cited

U.S. PATENT DOCUMENTS

| | | |
|---|---|---|
| 2012/0041618 A1 | 2/2012 | Sun et al. |
| 2012/0050095 A1 | 3/2012 | Scherzinger |
| 2012/0116669 A1 | 5/2012 | Lee |
| 2012/0155389 A1 | 6/2012 | Mcnamee et al. |
| 2012/0158211 A1* | 6/2012 | Chen .................. G06Q 10/08 701/1 |
| 2012/0159142 A1 | 6/2012 | Jibbe et al. |
| 2012/0231821 A1 | 9/2012 | Swanson |
| 2012/0233237 A1 | 9/2012 | Roa et al. |
| 2012/0233668 A1 | 9/2012 | Leafe et al. |
| 2012/0253551 A1 | 10/2012 | Halimi et al. |
| 2012/0253585 A1 | 10/2012 | Harvie |
| 2012/0259526 A1 | 10/2012 | Inoue |
| 2012/0303203 A1 | 11/2012 | Olsen et al. |
| 2013/0002415 A1 | 1/2013 | Walli |
| 2013/0024202 A1 | 1/2013 | Harris |
| 2013/0030811 A1 | 1/2013 | Olleon et al. |
| 2013/0038439 A1 | 2/2013 | Saito et al. |
| 2013/0073142 A1 | 3/2013 | Hergesheimer et al. |
| 2013/0095841 A1 | 4/2013 | Quimby et al. |
| 2013/0148554 A1 | 6/2013 | Chen et al. |
| 2013/0182693 A1 | 7/2013 | Sperling et al. |
| 2013/0244210 A1 | 9/2013 | Nath et al. |
| 2013/0249713 A1 | 9/2013 | Adelson |
| 2013/0275001 A1 | 10/2013 | Hergesheimer et al. |
| 2013/0288659 A1 | 10/2013 | Hrabak et al. |
| 2013/0297137 A1 | 11/2013 | Fushiki et al. |
| 2013/0302756 A1 | 11/2013 | Takeuchi |
| 2013/0338855 A1 | 12/2013 | Mason |
| 2014/0074315 A1 | 3/2014 | Frye et al. |
| 2014/0074353 A1 | 3/2014 | Lee et al. |
| 2014/0094210 A1 | 4/2014 | Gellens et al. |
| 2014/0095211 A1 | 4/2014 | Gloerstad et al. |
| 2014/0111354 A1 | 4/2014 | Hergesheimer et al. |
| 2014/0142886 A1 | 5/2014 | Hergesheimer et al. |
| 2014/0149145 A1 | 5/2014 | Peng |
| 2014/0180529 A1 | 6/2014 | Simon et al. |
| 2014/0236518 A1 | 8/2014 | Hergesheimer et al. |
| 2014/0236519 A1 | 8/2014 | Hergesheimer et al. |
| 2014/0237463 A1 | 8/2014 | Sriram et al. |
| 2014/0303836 A1 | 10/2014 | Phelan et al. |
| 2014/0309843 A1 | 10/2014 | Chen et al. |
| 2014/0358394 A1 | 12/2014 | Picciotti |
| 2014/0379208 A1 | 12/2014 | McQuade et al. |
| 2015/0015385 A1 | 1/2015 | Tomita et al. |
| 2015/0051796 A1 | 2/2015 | Levy |
| 2015/0178997 A1* | 6/2015 | Ohsaki ................. G07C 5/0808 701/29.1 |
| 2015/0268059 A1 | 9/2015 | Borghesani |
| 2015/0271271 A1 | 9/2015 | Bullotta et al. |
| 2015/0271299 A1 | 9/2015 | Bullotta et al. |
| 2015/0339241 A1 | 11/2015 | Warner et al. |
| 2016/0104123 A1 | 4/2016 | Viswanath et al. |
| 2016/0146615 A1* | 5/2016 | Abhishek ............. H04W 4/029 701/519 |
| 2016/0173281 A1 | 6/2016 | White et al. |
| 2016/0335813 A1 | 11/2016 | Hergesheimer et al. |
| 2016/0341559 A1 | 11/2016 | Camisa |
| 2017/0023610 A1 | 1/2017 | Hergesheimer et al. |
| 2017/0075835 A1 | 3/2017 | Langer |
| 2017/0147331 A1 | 5/2017 | Liem et al. |
| 2017/0318117 A1* | 11/2017 | Stenneth ............... H04Q 9/00 |
| 2018/0261020 A1* | 9/2018 | Petousis ............... G07C 5/0841 |
| 2019/0141156 A1 | 5/2019 | Srinivasulu |

FOREIGN PATENT DOCUMENTS

| | | |
|---|---|---|
| WO | 2014130077 A1 | 8/2014 |
| WO | 2014130078 A1 | 8/2014 |
| WO | 2014202110 A1 | 12/2014 |
| WO | 2015183677 A1 | 12/2015 |
| WO | 2016081901 | 5/2016 |
| WO | 2016191306 | 12/2016 |
| WO | 2019090366 A1 | 5/2019 |
| WO | 2019094988 A1 | 5/2019 |

OTHER PUBLICATIONS

Extended European Search Report for European Application No. 13875911.3, Search completed Nov. 22, 2016, dated Dec. 9, 2016, 6 Pgs.

International Preliminary Report on Patentability for International Application PCT/US2013/054939, dated Aug. 25, 2015, dated Sep. 3, 2015, 4 Pgs.

International Preliminary Report on Patentability for International Application PCT/US2013/054943, dated Aug. 25, 2015, dated Sep. 3, 2015, 6 Pgs.

International Search Report and Written Opinion for International Application No. PCT/US13/54939, Completed Feb. 5, 2014, dated Feb. 24, 2014, 5 pgs.

International Search Report and Written Opinion for International Application No. PCT/US13/54943, Completed Feb. 13, 2014, dated Feb. 27, 2014, 6 pgs.

International Search Report and Written Opinion for International Application PCT/US2015/061990, completed Jan. 12, 2016, dated Feb. 4, 2016, 6 pgs.

International Search Report and Written Opinion for International Application PCT/US2016/033621, completed Jul. 28, 2016, dated Aug. 5, 2016, 11 Pgs.

SAE International Surface Vehicle Recommended Practice, "E/E Diagnostic Test Modes", SAE Standard J1979, Issued Dec. 1991, 19 pgs.

SAE International Surface Vehicle Recommended Practice, "OBD II Scan Tool", SAE Standard J1978, Issued Mar. 1992, 13 pgs.

"Road vehicles—Diagnostic Systems—Part 2: CARB requirements for interchange of digital information", ISO 9141-2, Feb. 1, 1994, 18 pgs.

"Surface Vehicle Recommended Practice, E/E Diagnostic Test Modes, Dec. 1991, 32 pgs.".

"Surface Vehicle Recommended Practice, Universal Interface for OBD II Scan", SAE Standard J2201, Issued Jun. 30, 1993, 45 pgs.

"Surface Vehicle Recommended Practice; OBD II Scan Tool, Mar. 1992, 14 pgs.".

ETSI, "GSM Technical Specification", GSM 07.07, Version 5.0.0, Jul. 1, 1996, 77 pgs.

International Search Report and Written Opinion for International Application No. PCT/US2018/061648, Search completed Feb. 12, 2019, dated Apr. 15, 2019, 14 Pg.

International Search Report and Written Opinion for International Application No. PCT/US2018/061650, Search completed Feb. 17, 2019, dated Mar. 25, 2019, 17 Pgs.

International Preliminary Report on Patentability for International Application PCT/US2018/061650 Report dated May 12, 2020, dated May 22, 2020, 11 Pgs.

International Preliminary Report on Patentability for International Application PCT/US2018/061648 Report dated May 12, 2020, dated May 22, 2020, 9 Pgs.

* cited by examiner

FIG. 5

SYSTEMS AND METHODS FOR DYNAMIC DEVICE PROGRAMMING

CROSS REFERENCE TO RELATED APPLICATIONS

The instant application claims priority to U.S. Provisional Patent Application No. 62/582,818, filed Nov. 7, 2017, the disclosure of which is hereby incorporated by reference in its entirety.

FIELD OF THE INVENTION

The present invention relates to system communication processing and more specifically to dynamically processing disparate messages.

BACKGROUND

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, vehicle location determination, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

SUMMARY OF THE INVENTION

Systems and methods for dynamic device programming in accordance with embodiments of the invention are disclosed. One embodiment includes a vehicle telematics device including a processor, a memory containing a dynamic telematics messaging application, a plurality of accumulators, and a communications interface, wherein the dynamic telematics messaging application directs the processor to obtain a first message data describing a requested set of sensor data using the communications interface, dynamically reconfigure the plurality of accumulators to measure the requested set of sensor data, and transmit a second message data describing the measured set of sensor data.

In another embodiment, the processor includes a plurality of processing engines.

In a further embodiment, at least one of the plurality of processing engines is a virtual processing engine.

In still another embodiment, a first processing engine in the plurality of processing engines is directed to transcode the first message data into a format usable by a second processing engine in the plurality of processing engines.

In a still further embodiment, the first message data is encoded in a standardized message format.

In yet another embodiment, the vehicle telematics device is connected to a vehicle using the communications interface.

In a yet further embodiment, the communications interface includes a diagnostic port connector.

In another additional embodiment, the dynamic telematics messaging application further directs the processor to determine what sensor devices are available from the vehicle, generate configuration data based on the available sensor devices, and dynamically reconfigure the plurality of accumulators based on the configuration data.

In a further additional embodiment, dynamically reconfiguring the plurality of accumulators includes assigning at least one accumulator in the plurality of accumulators to a sensor device.

In another embodiment again, the configuration data describes what sensor devices are available and which sensor data are to be stored.

In a further embodiment again, a method for dynamically configuring a vehicle telematics device includes obtaining a first message data from a vehicle telematics server system using a communications interface, reconfiguring at least one accumulator in a plurality of accumulators to store sensor data based on the first message data, and transmitting a second message data describing the sensor data using the communications interface.

In still yet another embodiment, the method further includes transcoding the first message data from a first format to a second format, where the first format is not usable by at least one processing engine.

In a still yet further embodiment, the at least one processing engine is a virtual processing engine.

In still another additional embodiment, the method further includes connecting to a vehicle via a communications interface, determining a plurality of sensor devices from the vehicle, generating a configuration data based on the plurality of sensor devices, and reconfiguring the at least one accumulator in the plurality of accumulators to store a set of sensor data from the plurality of sensor devices.

In a still further additional embodiment, the configuration data includes priority data describing which sensor data should be measured.

In still another embodiment again, reconfiguring at least one accumulator in a plurality of accumulators to store sensor data further includes updating a configuration data describing which sensor devices are available, wherein the configuration data includes a priority data describing which sensor data should be measured.

In a still further embodiment again, the priority data includes a behavior profile.

In yet another additional embodiment, the first message data is obtained from a dynamic telematics server system.

In a yet further additional embodiment, a vehicle telematics device includes a first processing engine for directed to generate status reports, a second processing engine directed to process sensor data, a third processing engine directed to transcode message data for the first and second processing engines, a plurality of accumulators configured to store sensor data, and a memory comprising a dynamic telematics messaging application, wherein the dynamic telematics messaging application directs the processor to obtain a first message data in a first message format from a dynamic telematics server system, classify the transcoded message data, transcode the first message data to a second format using the third processing engine, process the transcoded message data using the appropriate processing engine, reconfigure the plurality of accumulators based on the transcoded message data, generate a second message data based on the sensor data stored by the plurality of accumulators, and provide the second message data.

In yet another embodiment again, the first, second, and third processing engines are virtual processing engines.

In a yet further embodiment again, the vehicle telematics device further includes a communications interface connected to the diagnostic port of a vehicle.

In another additional embodiment again, the dynamic telematics messaging application further directs the processor to obtain sensor data from the vehicle.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the prepended claims.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Turning now to the drawings, systems and methods for dynamic device programming in accordance with embodiments of the invention are disclosed. Fleets of vehicles are a core component of many industries such as logistics and personal transportation. In many cases, it can be beneficial to be able to monitor and track the status of vehicles within the fleet. As such, many vehicles are equipped with vehicle telematics devices. These vehicle telematics devices can obtain and/or measure a variety of data regarding the conditions and/or location of the vehicle along with receiving and transmitting data to telematics server systems. Vehicle telematics devices can have a set of accumulators configured to store measured data. However, there are often not enough accumulators to store all measurable data. Furthermore, vehicle telematics devices may be preprogrammed to measure a certain set of data, but without knowing what type of vehicle it is going to be connected to, there is a chance that accumulator space may be unused and/or the device itself may need to be reprogrammed post-installation. Vehicle telematics devices can include one or more processing engines. In a variety of embodiments, processing engines can include engines for processing and generating status reports and processing and generating sensor data messages, although any processing engines can be utilized as appropriate to the requirements of specific applications of embodiments of the invention.

In many embodiments, vehicle telematics devices can automatically detect the type of available data after connecting to a vehicle. In numerous embodiments, vehicle telematics devices can dynamically assign accumulators to change what data is measured and/or reported back to a telematics server system. Vehicle telematics devices can change their behavior in response to messages from telematics server systems including, but not limited to, what data is being stored, what data is being transmitted, the format of transmitted messages, and/or any other behavioral change as appropriate to the requirements of a given application. In numerous embodiments, vehicle telematics devices include a processing engine for transcoding messages into formats usable by other processing engines. In this way, vehicle telematics devices can automatically maintain compatibility with a variety of telematics server systems and/or messaging formats while maintaining functionality and/or compatibility with legacy on-board processing engines. Systems and methods for dynamic telematics messaging, including a variety of formats for transmitting messages within a vehicle telematics system, that can be utilized in accordance with embodiments of the invention are described in U.S. patent application Ser. No. 15/818,260 entitled "Systems and Methods for Dynamic Telematics Messaging", filed Nov. 20, 2017, the disclosure of which is hereby incorporated by reference in its entirety.

Vehicle Telematics Systems

Figure 1:
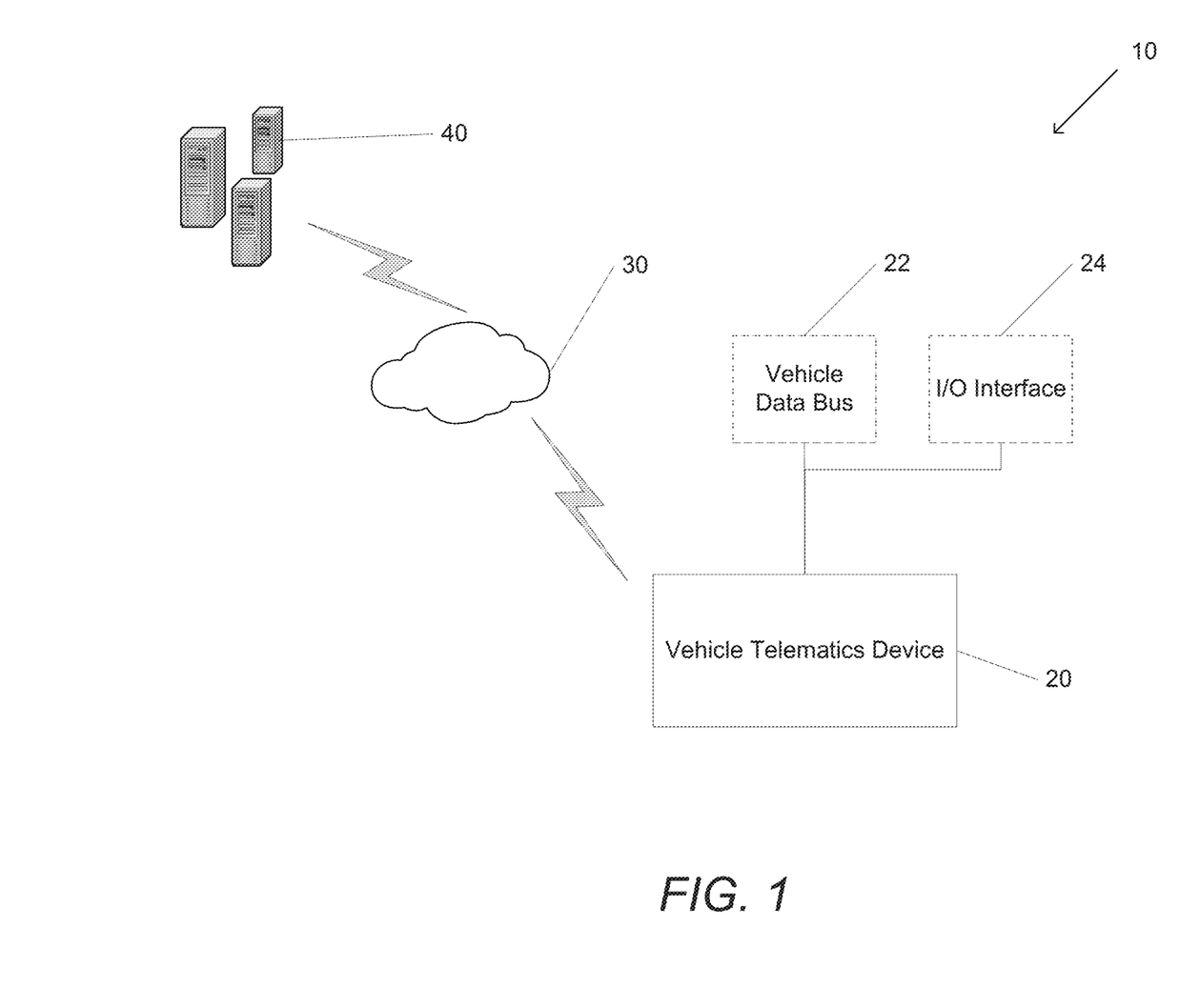
FIG. 1 is a conceptual illustration of a vehicle telematics system in accordance with an embodiment of the invention.

Vehicle telematics systems in accordance with embodiments of the invention can transmit a variety of data between a telematics server system and a vehicle telematics device. A conceptual diagram of a vehicle telematics system in accordance with an embodiment of the invention is shown in FIG. 1. The vehicle telematics system 10 includes a vehicle telematics device 20 that can communicate with a vehicle data bus 22, an input/output (I/O) interface 24, and/or a network 30 as appropriate to the requirements of specific applications of embodiments of the invention. In a variety of embodiments, vehicle telematics device 20 communicates with a telematics server system 40 via the network 30. In a variety of embodiments, the network 30 is the Internet. In many embodiments, the network 30 is any wired or wireless network, such as a cellular network, between the vehicle telematics device 20 and the telematics server system 40. In a number of embodiments, the telematics server system 40 implemented using a single server system. In several embodiments, the telematics server system 40 is implemented using multiple server systems.

In a variety of embodiments, the vehicle telematics device 20 is installed in a vehicle having a vehicle data bus 22. In several embodiments, the vehicle telematics device 20 is connected to a vehicle diagnostic connector that provides access to the vehicle data bus 22. The vehicle telematics device 20 can obtain data from any of a variety of vehicle devices connected to the vehicle data bus 22 utilizing any of a variety of techniques as appropriate to the requirements of specific applications of embodiments of the invention. Vehicle devices can include, but are not limited to, engine sensors, electronic control unit (ECU) devices, alternator sensors, vibration sensors, voltage sensors, oxygen sensors, Global Positioning System (GPS) receivers, ignition devices, weight sensors, wireless network devices, and/or acceleration determination devices. Systems and methods for connecting to a vehicle data bus that can be utilized in accordance with embodiments of the invention are described in SAE J1978, titled "OBD II Scan Tool," first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014. The disclosures of SAE J1978 and SAE J1979 are hereby incorporated by reference in their entirety.

The vehicle telematics device 20 can include any of a variety of sensors and/or devices, including those described above with respect to the vehicle data bus and any described in more detail below, to obtain data regarding the status of the vehicle. The vehicle telematics device 20 can also communicate with any of a variety of sensors and/or devices using the I/O interface 24. The I/O interface 24 can be any connection, including wired and wireless connections, as appropriate to the requirements of specific applications of embodiments of the invention. In several embodiments, the vehicle telematics device 20 is capable of executing scripts to read data and/or perform particular processes. These scripts can be pre-loaded on the device and/or obtained from the telematics server system 40, vehicle data bus 22, and/or the I/O interface 24 as appropriate to the requirements of specific applications of embodiments of the invention. The vehicle telematics device 20 can be self-powered and/or connected into the electrical system of the vehicle in which the vehicle telematics device 20 is installed. In a variety of embodiments, the vehicle telematics device is powered via the vehicle data bus 22 and/or the I/O interface 24. In many embodiments, the vehicle telematics device 20 utilizes a Global Positioning System (GPS) receiver in order to determine the location, speed, and/or acceleration of the vehicle. However, it should be noted that any location-determining techniques, such as cellular tower triangulation, wireless network geolocation techniques, and dead reckoning techniques, could be utilized as appropriate to the requirements of specific applications of embodiments of the invention.

In a variety of embodiments, the vehicle telematics device 20 and/or telematics server system 40 provides a user interface allowing for visualizing and interacting with the data transmitted and/or received between the systems. In several embodiments, the vehicle telematics device 20 and/or telematics server system 40 provide an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Although a specific architecture of a vehicle telematics system in accordance with embodiments of the invention are discussed above and illustrated in FIG. 1, a variety of architectures, including sensors and other devices and techniques not specifically described above, can be utilized in accordance with embodiments of the invention. Furthermore, the processes described herein can be performed using any combination the vehicle telematics device and/or the telematics server system as appropriate to the requirements of specific applications of embodiments of the invention.

Vehicle Telematics Devices

Figure 2A:
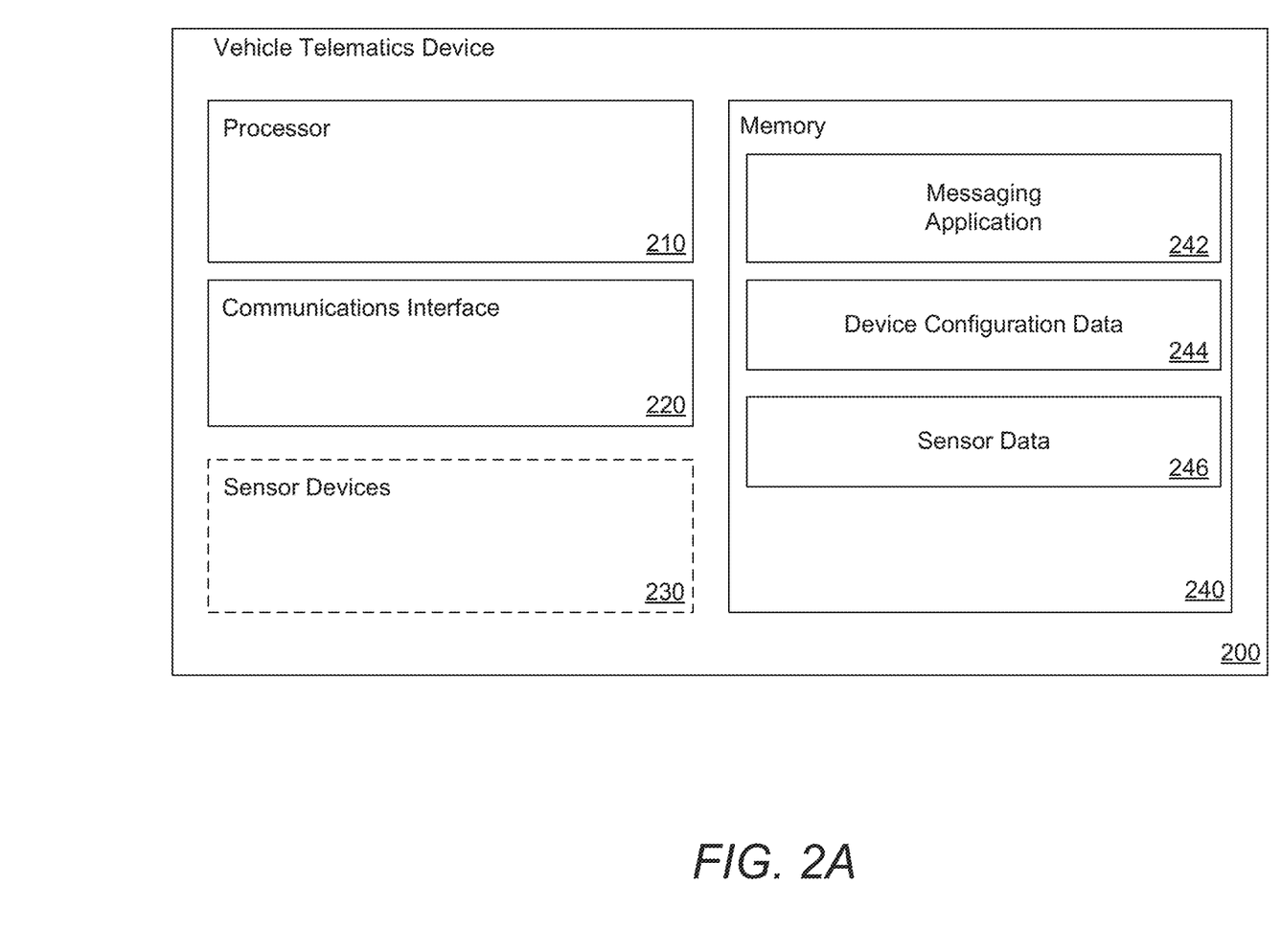
FIG. 2A is a conceptual illustration of a vehicle telematics device in accordance with an embodiment of the invention.

Vehicle telematics devices in accordance with many embodiments of the invention can transmit and receive data. A conceptual illustration of a vehicle telematics device in accordance with an embodiment of the invention is shown in FIG. 2A. The vehicle telematics device 200 includes a processor 210 in communication with a memory 240. Processor 210 can include any number of processing engines. In many embodiments, three processing engines are used. Processing engines can have specialized purposes including, but not limited to, processing sensor data, generating reports, transcoding messages, and/or any other purpose as appropriate to the requirements of a given application. Processing engines can be implemented in hardware and/or as virtual processing engines. In many embodiments, memory includes a series of accumulators configured to store bit strings. Accumulators can be assigned static identifiers, e.g. 0, 1, 2 . . . etc. The vehicle telematics device 200 includes a communications interface 220 capable of sending and receiving data. Although the processor 210 and communications interface 220 are illustrated as separate components, some or all of these devices can be implemented using a single-chip solution as appropriate to the requirements of specific applications of embodiments of the invention.

Sensor devices 230 can include, but are not limited to, RPM sensors, voltage sensors, GPS receivers, noise sensors, vibration sensors, acceleration sensors, weight sensors, and any other device capable of measuring data regarding a vehicle as appropriate to the requirements of specific applications of embodiments of the invention. In certain embodiments, sensor devices 230 are included within the vehicle telematics device 200. However, vehicle telematics devices can also acquire sensor data from sensor devices located externally to the vehicle telematics device 200. In a variety of embodiments, sensor devices 230 include any sensors integrated into the vehicle and transmitted to the vehicle telematics device 200. In many embodiments, sensors are integrated into the vehicle and transmitted over a vehicle data bus. In numerous embodiments, sensor readings are stored as bit strings in the series of accumulators.

In several embodiments, the memory 240 is any form of storage storing a variety of data, including, but not limited to, a messaging application 242, device configuration data 244, and/or sensor data 246. In many embodiments, the messaging application 242, device configuration data 244, and/or sensor data 246 are stored using an external server system and received by the vehicle telematics device 200 using the communications interface 220. Device configuration data can be used to direct the processor to generate messages in a chosen static message profile. In a variety of embodiments, dynamic messaging applications can generate dynamic messages that require minimal processing by dynamic telematics messaging systems. In numerous embodiments, device configuration data 244 describes what sensor data is available and/or which types of sensor data are currently being collected.

Figure 2B:
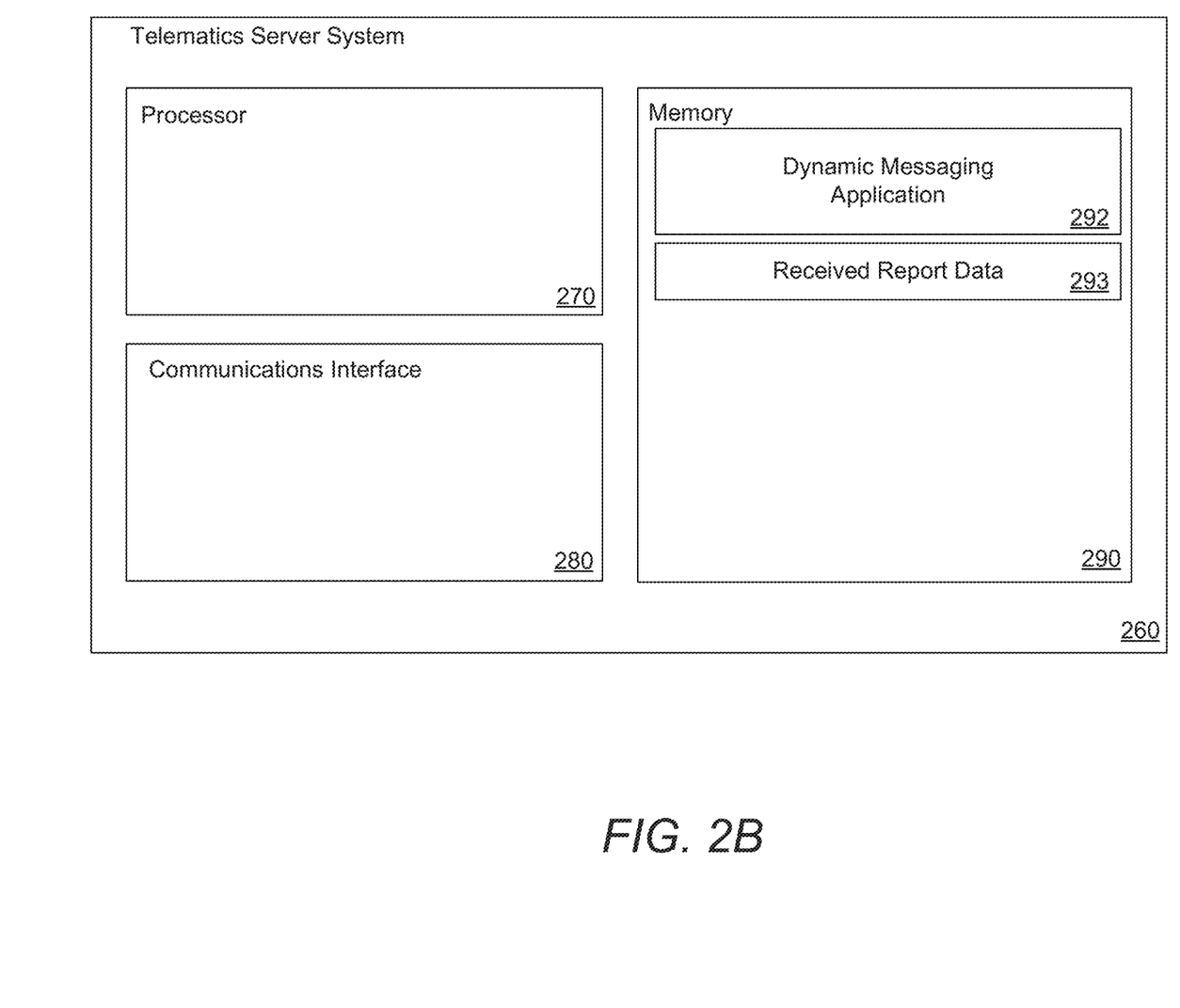
FIG. 2B is a conceptual illustration of a telematics server system in accordance with an embodiment of the invention.

Turning now to FIG. 2B, a conceptual illustration of a telematics server system is shown. The telematics server system 260 contains a processor 270 in communication with a memory 290 and a communications interface 280. Processor 270 can be any type of computational processing unit, including, but not limited to, microprocessors, central processing units, graphical processing units, parallel processing engines, or any other type of processor as appropriate to the requirements of a given application. The communications interface 280 can be utilized to transmit and receive messages from and to vehicle telematics devices, as well as to transmit data between server systems and interface devices. Communications interface 280 can include multiple ports and/or technologies in order to communicate with various devices as appropriate to the requirements of specific applications of embodiments of the invention.

Memory 290 can be implemented using any combination of volatile and/or non-volatile memory, including, but not limited to, random access memory, read-only memory, hard disk drives, solid-state drives, flash memory, or any other memory format as appropriate to the requirements of a given application. In several embodiments, the memory 290 stores a variety of data, including, but not limited to, a dynamic messaging application 292 and/or received report data 293. In many embodiments, the dynamic messaging application 292 and/or received report data 293 are stored using an external server system and received by the telematics server system 200 using the communications interface 280.

Processor 210 and processor 270 can be directed, by messaging application 242 and dynamic messaging application 292, to perform a variety of dynamic telematics messaging processes. As described in more detail below dynamic messaging processes can include, but are not limited to, dynamically configuring a vehicle telematics device and generating message data including data read using one or more sensor devices.

Although specific architectures for vehicle telematics devices and telematics server systems in accordance with embodiments of the invention are conceptually illustrated in FIGS. 2A and 2B, any of a variety of architectures, including those that store data or applications on disk or some other form of storage and are loaded into memory at runtime, can also be utilized. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices such as, but not limited to, systems-on-a-chip (SoC). Furthermore, telematics server systems can be implemented on multiple servers within at least one server system. For example, telematics server system systems can be implemented on various remote "cloud" server systems as appropriate to the requirements of a given application.

Configuring Vehicle Telematics Devices

Figure 3:
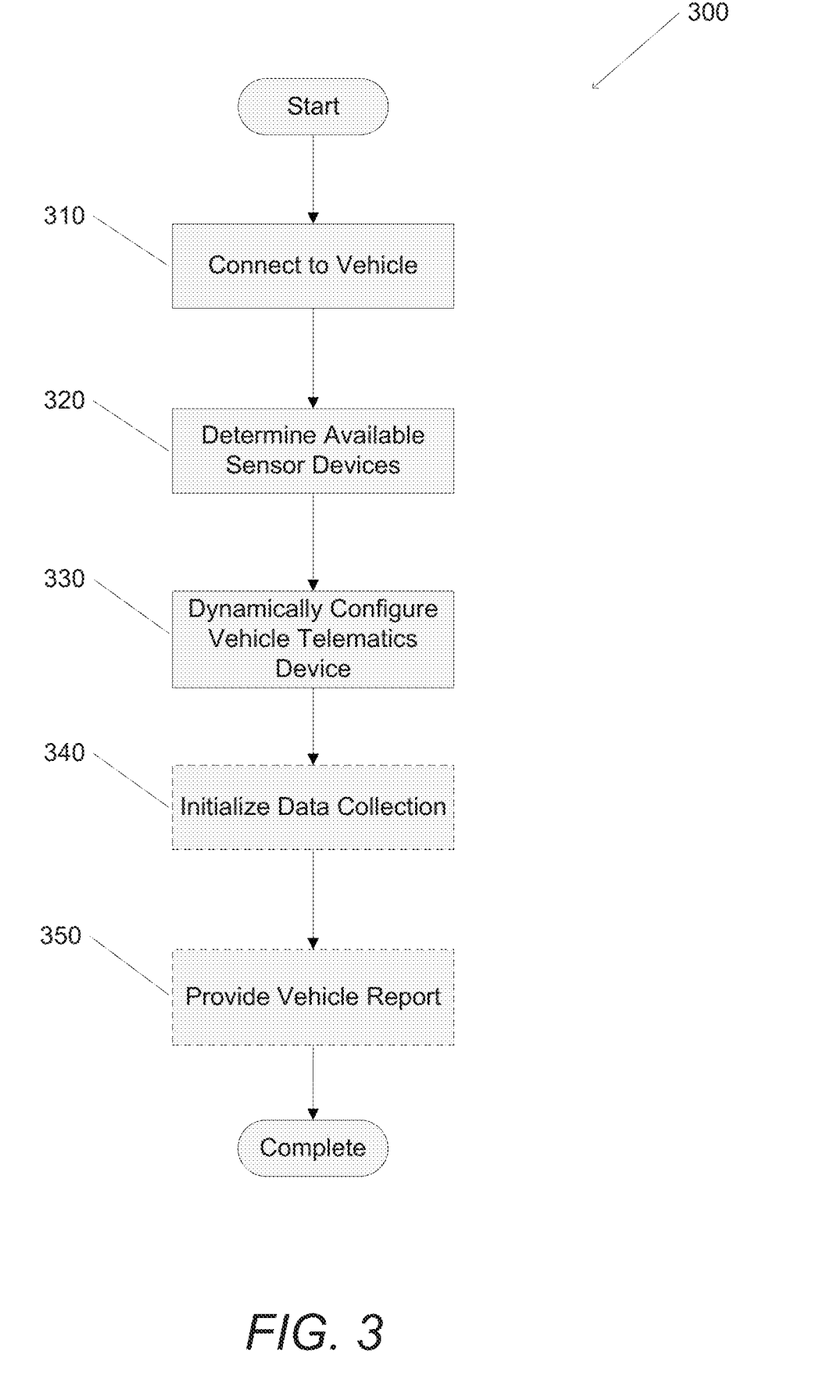
FIG. 3 is a flow chart illustrating a process for automatically configuring a vehicle telematics device in accordance with an embodiment of the invention.

When vehicle telematics devices are connected to vehicles, they can determined what data and/or is available, and accumulators can be assigned to different data types. Dynamic telematics messaging processes in accordance with embodiments of the invention can include querying the vehicle to generate initialization data and automatically configure the vehicle telematics device. Turning now to FIG. 3, a process for dynamically configuring a vehicle telematics device in accordance with an embodiment of the invention is illustrated. Process 300 includes connecting (310) to a vehicle. In many embodiments, the connection is made to the vehicle data bus. In numerous embodiments, the connection to the vehicle data bus is made via a diagnostic port located within the vehicle. However, any number of connection methods, including direct wiring into particular devices and/or sensors located within the vehicle, can be used as appropriate to the requirements of a given application.

Process 300 further includes determining (320) available sensor devices. In numerous embodiments, the determination of available sensor devices includes detecting what sensor devices are available via the vehicle data bus. In many embodiments, the available sensors devices is determined using a bus discovery process, such as those described in SAE J1978 and J1979 incorporated by reference above. The bus discovery process can provide a list of sensor devices in a variety of formats, including a bit string matching a standardized format, as appropriate to the requirements of specific applications of embodiments of the invention. In a variety of embodiments, vehicle identification information such as, but not limited to, a vehicle identification number (VIN), are used to determine what sensor devices are available. In numerous embodiments, vehicle identification information can be used to query a database to determine an appropriate initial device configuration data.

The vehicle telematics device can be dynamically configured (330). In many embodiments, device configuration data generated based on the available sensor devices is used to configure the vehicle telematics device. In numerous embodiments, sensor data are dynamically assigned to accumulators. If there are more sensor devices and/or collectable types of data available than there are accumulators, a record can be kept of available sensor devices. In many embodiments, which sensors are assigned to accumulators is determined based on a predetermined priority data describing which data is of highest value. In a number of embodiments, the assignment of sensor devices to accumulators can be automatically updated based on requests for data from particular sensor devices.

In a number of embodiments, process 300 also includes initializing (340) data collection and/or providing (350) a vehicle report. In many embodiments, initializing data collection includes storing sensor data in accumulators. Vehicle reports can include information about available sensor data, the type of vehicle, the time of install, and/or any other initialization information as appropriate to the requirements of a given application. In several embodiments, the vehicle report is generated by a script that automatically compiles the current value of one or more accumulators.

Specific processes for configuring vehicle telematics devices in accordance with embodiments of the invention are described above and shown with respect to FIG. 3; however, any number of processes, including those that use alternative techniques for determining available sensor devices and/or storing sensor data, can be utilized as appropriate to the requirements of a specific application in accordance with embodiments of the invention.

Dynamically Reconfiguring Vehicle Telematics Devices

Figure 4:
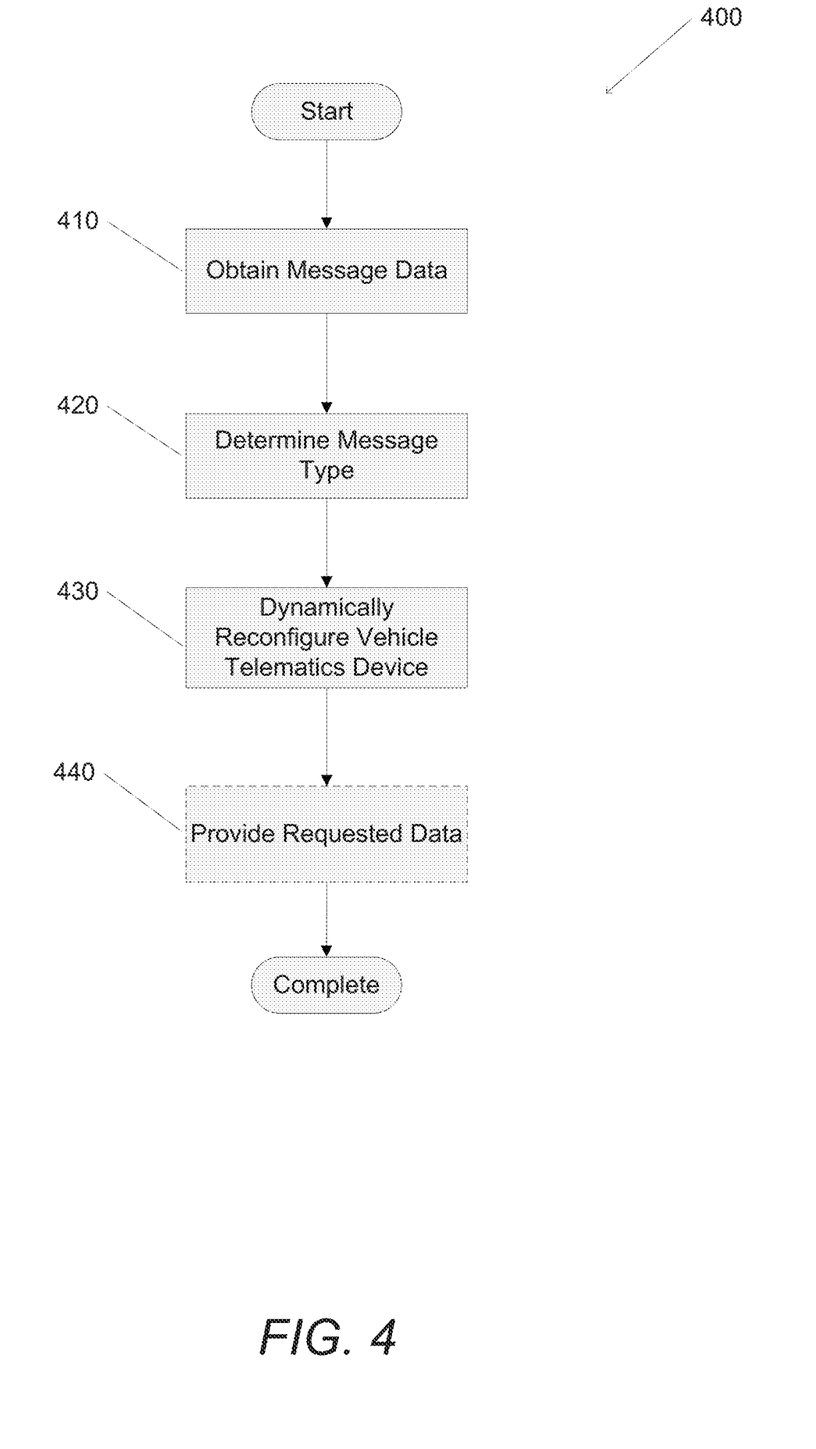
FIG. 4 is a flow chart illustrating a process for reconfiguring vehicle telematics devices in accordance with an embodiment of the invention.

There are situations where data that is accessible by a vehicle telematics device is not being recorded and/or there is a request for particular data to be measured by a vehicle telematics device. In several embodiments, messages can be provided to vehicle telematics devices to dynamically reconfigure its behavior. Dynamic telematics messaging processes in accordance with embodiments of the invention can include dynamically reconfiguring vehicle telematics devices in response to a message. Turning now to FIG. 4, a method for dynamically reconfiguring a vehicle telematics device in accordance with an embodiment of the invention is illustrated. Process 400 includes obtaining (410) message data. The message type can be determined (420). Message types can be, but are not limited to, messages that request changes in sensor data, message format, communications protocol, firmware updates, and/or any other reconfigurable behavior in accordance with an embodiment of the invention.

The vehicle telematics device can be dynamically reconfigured (430) based on the message data. In many embodiments, when the message data includes a request for a change in sensor data, the requested sensor data is assigned to an accumulator. The particular accumulator utilized can be determined automatically and/or defined in the message data as appropriate to the requirements of specific applications of embodiments of the invention. If there are no available accumulators, an accumulator currently in use can be reassigned to store the requested sensor data. In numerous embodiments, the message indicates which sensor data is no longer required so that the accumulator previously used to store the data is reassigned. In a variety of embodiments, the accumulator to be reassigned is based on predetermined priority data. However, which accumulator is reassigned can be determined in any number of ways, including, but not limited to number of times an accumulator has been reassigned, and/or any other metric as appropriate to the requirements of a given application of the invention. In a variety of embodiments, device configuration data can describe a number of behavior profiles indicating accumulator assignments. In many embodiments, the message data can include a request for a new behavior profile from stored behavior profiles and/or transmit a new behavior profile. When the message requests a change in reporting data format(s), the vehicle telematics device can dynamically reconfigure the message structure used to generate vehicle reports. In numerous embodiments, when the message requests a change in transmission protocol, the vehicle telematics device can be dynamically reconfigured to communicate via the updated transmission protocol.

Process 400 can further include providing (440) requested data. In numerous embodiments, the requested data contains the newly requested sensor data. In many embodiments, the requested data is in a message format includes containers for a large number of different types of data, but only the types of data stored accumulators are stored in the message. In numerous embodiments, identifying data about the vehicle and/or vehicle telematics device are stored in the message. Identifying data can be stored as metadata in message format. In a variety of embodiments, the requested data includes one or more vehicle reports as described in more detail above.

Specific processes for dynamically reconfiguring vehicle telematics devices in accordance with embodiments of the invention are described above and shown with respect to FIG. 4; however, any number of processes, including those that use alternative techniques for allocating memory, can be utilized as appropriate to the requirements of a specific application in accordance with embodiments of the invention.

Transcoding Message Data

Vehicle telematics devices can perform a variety of processes to transcode message data in a first format into a second format usable by specific processing engines. Dynamic telematics messaging processes in accordance with embodiments of the invention can include transcoding received messages into specific formats. For example, the first message format can utilize the extensible markup language (XML) standard, while the second format includes a hex-encoded bit string. However, it should be noted that any data formats can be utilized and/or transcoded as appropriate to the requirements of specific applications of embodiments of the invention.

Figure 5:
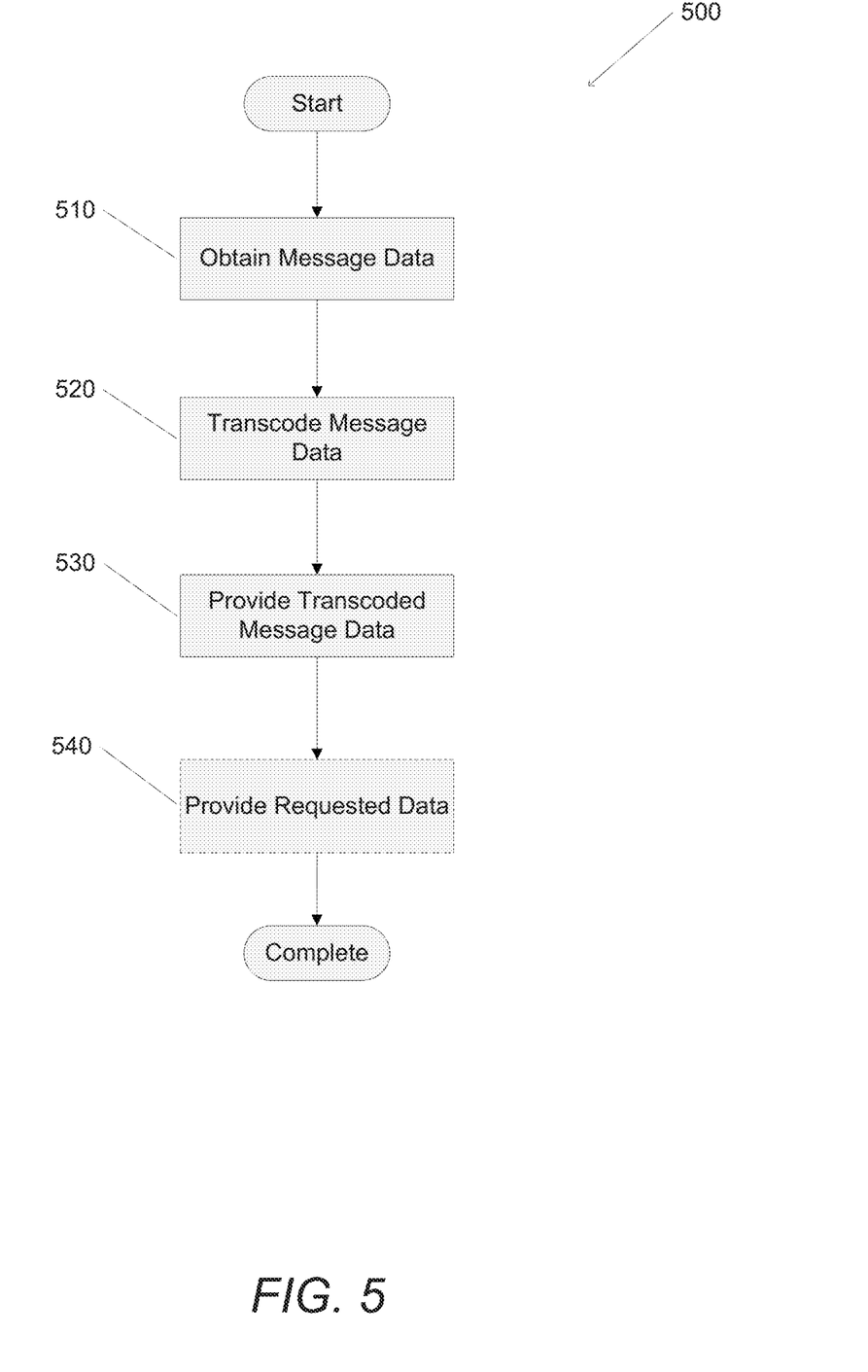
FIG. 5 is a flow chart illustrating a process for transcoding message data in accordance with an embodiment of the invention.

Turning now to FIG. 5, a process for providing transcoded message data in accordance with an embodiment of the invention is illustrated. Process 500 includes obtaining (510) message data. In numerous embodiments, obtained message data is in a format that is typically not readable by vehicle telematics devices. Message data can be transcoded (520) into a usable format. In many embodiments, message data is encoded in a standardized format that is not readable by vehicle telematics devices. Standardized message data can be converted into a device specific format. In numerous embodiments, message data is transcoded by applying a set of rules describing transformations of instruction data stored within message data. In many embodiments, the instruction data provides requests for data such as, but not limited to, sensor data. In a variety of embodiments, instruction data describes changes to communications protocols. The instruction data can be stored as transcoded message data. The transcoded message data can be provided (530). In numerous embodiments, the transcoded message data is provided to hardware within a vehicle telematics device. In a variety of embodiments, the transcoded message data is provided to a processing engine executing within the vehicle telematics device. However, any transcoded message data can be provided to any number of devices such as, but not limited to, relays, modems, user interfaces, and/or any other device as appropriate to the requirements of a given application.

In many embodiments, transcoded message data can trigger processes for dynamically reconfiguring vehicle telematics devices. In numerous embodiments, data requested by transcoded message data can be provided (540). In numerous embodiments, the provided data includes one or more vehicle reports as described in more detail above.

Specific processes for providing transcoded message data in accordance with embodiments of the invention are described above and shown with respect to FIG. 5; however, any number of processes, including those that use alternative transcoding techniques, can be utilized as appropriate to the requirements of a specific application in accordance with embodiments of the invention.

Although the present invention has been described in certain specific aspects, many additional modifications and variations would be apparent to those skilled in the art. In particular, any of the various processes described above can be performed in alternative sequences and/or in parallel in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

What is claimed is:

1. A vehicle telematics device comprising:
   a processor;
   a memory storing a dynamic telematics messaging application;
   a plurality of accumulators; and
   a communications interface;
   wherein the dynamic telematics messaging application directs the processor to:
      obtain a first message data describing a requested sensor data from a corresponding sensor device using the communications interface;

determine whether each accumulator of the plurality of accumulators has been previously assigned to store a corresponding sensor data different from the requested sensor data;

select, in response to a determination that each accumulator of the plurality of accumulators has been previously assigned to store a corresponding sensor data, a first accumulator of the plurality of accumulators to be dynamically reconfigured to store the requested sensor data, wherein the first accumulator is selected based on the first message data and the sensor data previously assigned to the first accumulator;

dynamically reconfigure the first accumulator to measure the requested sensor data by reassigning the first accumulator from the sensor data previously assigned to the first accumulator to the requested sensor data to store the requested sensor data received from the corresponding sensor device; and transmit a second message data describing the measured set of sensor data.

2. The vehicle telematics device of claim 1, wherein the processor comprises a plurality of processing engines.

3. The vehicle telematics device of claim 2, wherein at least one of the plurality of processing engines is a virtual processing engine.

4. The vehicle telematics device of claim 2, wherein a first processing engine in the plurality of processing engines is directed to transcode the first message data into a format usable by a second processing engine in the plurality of processing engines.

5. The vehicle telematics device of claim 1, wherein the first message data is encoded in a standardized message format.

6. The vehicle telematics device of claim 1, wherein the vehicle telematics device is connected to a vehicle using the communications interface.

7. The vehicle telematics device of claim 6, wherein the communications interface comprises a diagnostic port connector.

8. The vehicle telematics device of claim 6, wherein the dynamic telematics messaging application further directs the processor to: determine what sensor devices are available from the vehicle; generate configuration data based on the available sensor devices; and dynamically reconfigure the plurality of accumulators based on the configuration.

9. The vehicle telematics device of claim 8, wherein dynamically reconfiguring the plurality of accumulators comprises assigning at least one accumulator in the plurality of accumulators to an available sensor device.

10. The vehicle telematics device of claim 8, wherein the configuration data describes what sensor devices are available and which sensor data are to be stored.

11. A method for dynamically configuring a vehicle telematics device, the method comprising:

obtaining a first message data describing a requested sensor data from a corresponding sensor device from a vehicle telematics server system using a communications interface;

determining whether each accumulator of a plurality of accumulators has been previously assigned to store a corresponding sensor data different from the requested sensor data;

selecting, in response to a determination that each accumulator of the plurality of accumulators has been previously assigned to store a corresponding sensor data, a first accumulator of the plurality of accumulators to be dynamically reconfigured to store the requested sensor data, wherein the first accumulator is selected based on the first message data and the sensor data previously assigned to the first accumulator;

dynamically reconfiguring the first accumulator to measure the requested sensor data by reassigning the first accumulator from the sensor data previously assigned to the first accumulator to the requested sensor data to store the requested sensor data received from the corresponding sensor device; and transmitting a second message data describing the measured sensor data using the communications interface.

12. The method of claim 11 further comprising transcoding the first message data from a first format to a second format, where the first format is not usable by at least one processing engine.

13. The method of claim 12, wherein the at least one processing engine is a virtual processing engine.

14. The method of claim 11 further comprising:
connecting to a vehicle via a communications interface;
determining a plurality of available sensor devices from the vehicle;
generating a configuration data based on the plurality of available sensor devices; and
reconfiguring the plurality of accumulators to store a set of sensor data from the plurality of available sensor devices.

15. The method of claim 14, wherein the configuration data comprises priority data describing which sensor data should be measured.

16. The method of claim 11, wherein dynamically reconfiguring the plurality of accumulators further comprises updating a configuration data describing which sensor devices are available, wherein the configuration data comprises a priority data describing which sensor data should be measured.

17. The method of claim 16, wherein the priority data comprises a behavior profile.

18. The method of claim 11, wherein the first message data is obtained from a dynamic telematics server system.

19. A vehicle telematics device comprising:
a first processing engine directed to generate status reports;
a second processing engine directed to process sensor data;
a third processing engine directed to transcode message data for the first and second processing engines;
a communications interface connected to the diagnostic port of a vehicle;
a plurality of accumulators configured to store sensor data from a plurality of different sensor devices of the vehicle via the communications interface; and
a memory comprising a dynamic telematics messaging application, wherein the dynamic telematics messaging application directs the processor to:
obtain a first message data in a first message format from a dynamic telematics server system;
transcode the first message data to a second format using the third processing engine;
process the transcoded message data using the appropriate processing engine, wherein the transcoded message data describes a requested sensor data from a corresponding sensor device;
determine whether each accumulator of the plurality of accumulators has been previously assigned to store a corresponding sensor data different from the requested sensor data;

select, in response to a determination that each accumulator of the plurality of accumulators has been previously assigned to store a corresponding sensor data, a first accumulator of the plurality of accumulators to be dynamically reconfigured to store the requested sensor data, wherein the first accumulator is selected based on the transcoded message data and the sensor data previously assigned to the first accumulator;

dynamically reconfigure the first accumulator to measure the requested sensor data by reassigning the first accumulator from the sensor data previously assigned to the first accumulator to the requested sensor data to store the requested sensor data received from the corresponding sensor device;

generate a second message data based on the sensor data stored by the plurality of accumulators; and provide the second message data.

20. The vehicle telematics device of claim 19, wherein the first, second, and third processing engines are virtual processing engines.

* * * * *